United States Patent [19]

Vaupel et al.

[11] Patent Number: 5,361,278
[45] Date of Patent: Nov. 1, 1994

[54] PROCESS FOR TRANSMITTING A SIGNAL

[75] Inventors: Thomas Vaupel, Essen; Detlef Krahé, Kempen, both of Germany

[73] Assignee: Telefunken Fernseh und Rundfunk GmbH, Hanover, Germany

[21] Appl. No.: 853,752

[22] PCT Filed: Oct. 4, 1990

[86] PCT No.: PCT/EP90/01661

§ 371 Date: Aug. 24, 1992

§ 102(e) Date: Aug. 24, 1992

[87] PCT Pub. No.: WO91/05411

PCT Pub. Date: Apr. 18, 1991

[30] Foreign Application Priority Data

Oct. 6, 1989 [DE] Germany .................. 3933470

[51] Int. Cl.$^5$ ............ H04B 1/66; G10L 3/02; G10L 5/00
[52] U.S. Cl. ........................ 375/122; 381/29; 381/36; 381/37
[58] Field of Search ............ 375/122; 381/35, 34, 381/36, 29, 30, 31; 395/2

[56] References Cited

U.S. PATENT DOCUMENTS

| | | | |
|---|---|---|---|
| 4,942,607 | 7/1990 | Schröder et al. | 381/31 |
| 5,109,417 | 4/1992 | Fielder et al. | 381/36 |

FOREIGN PATENT DOCUMENTS

| | | |
|---|---|---|
| 193143 | 9/1986 | European Pat. Off. |
| 251028 | 1/1988 | European Pat. Off. |
| 90/09063 | 8/1990 | WIPO |

OTHER PUBLICATIONS

IEEE Transactions on Acoustics, Speech, and Signal Processing, vol. ASSP-34, No. 5, Oct. 1986; "Analysis/Synthesis Filter Bank Design Based on Time Domain Aliasing Cancellation", John P. Princen and Alan Bernard Bradley, pp. 1153-1161.

IEEE Transactions, 1987; "Subband/Transform Coding Using Filter Bank Designs Based on Time Domain Aliasing Cancellation", J. P. Princen, A. W. Johnson and A. B. Bradley, pp. 2161-2164.

Rundfunktechnische Mitteilungen, vol. 33, No. 4, Jul. 1989, Norderstedt DE; pp. 149-154; T. Vaupel: "Transformation-Scodierung Fuer Qualitativ Hoshwertige Audiosignale mit Signal vor-und-Nachverarbeitung im Zeitbereich" see p. 151, left hand column, line 25-31; see p. 152, left hand column, last paragraph-p. 153, left hand column, line 8.

*Primary Examiner*—Stephen Chin
*Assistant Examiner*—Kevin Kim
*Attorney, Agent, or Firm*—Joseph S. Tripoli; Eric P. Herrmann; Ronald H. Kurdyla

[57] ABSTRACT

A method of transmitting an analog signal including the steps of converting the analog signal into a digital signal and using windows to subdivide the digital signal into successive blocks. The blocks are evaluated for level changes, and when a level change is below a predetermined level the blocks are overlapped by 50%. The signal segments within the blocks assessed using analysis windows. The signal segments are transformed using subsampling and time domain aliasing cancellation to compensate for aliasing components. The signal segments are inverse transformed and assessed using synthesis windows. The blocks are rejoined in overlapping fashion. When the level change is above the predetermined level the signals are subdivided into blocks and the blocks are overlapped by less than 50%, or not overlapped at all. The signal segments are fully scanned, compressed and transformed. The signal segments are finally inverse transformed and expanded.

12 Claims, 6 Drawing Sheets

PROCESS FOR TRANSMITTING A SIGNAL

BACKGROUND OF THE INVENTION

This invention is directed to a method of transmitting a signal using digital compression techniques.

The transmission of an audio signal, for example, radio broadcast transmission, cable transmission, satellite transmission and with recording devices entails converting the analog signal into a digital signal with a certain resolution. The digital signal is transmitted and reconverted into an analog signal upon reproduction. The signal-to-noise ratio is enhanced, particularly upon reproduction, by using digital transmission.

The band width required for the transmission of such a signal is essentially determined by the number of scanning values per time unit which are to be transmitted. The resolution is also a function of the number of scanning values transmitted. In practice, it is preferable to keep the transmission band width as small as possible in order to be able to transmit as many audio signals as possible simultaneously via a wide band channel would appear that the necessary band width can be reduced by decreasing the number of scanning values or the number of hits per scanning value. However, as a rule this measure results in a deterioration in the quality of the reproduction.

A method described in DE-OS 35 06 912, improves the reproduction quality by separating the digital audio signal into successive temporal segments and transforming the audio signal into a short-time spectrum which represents the spectral components of the signal for the respective time segments. Generally, in the short-time spectrum, for reasons of psycho-acoustic laws, components which are not perceived by the listener, i.e. are irrelevant from a communications technology viewpoint, can be discovered more readily than in the time domain. Upon transmission, these components are given less weight, or are left out entirely. This allows a considerable part of the otherwise necessary data to be left out and the average bit rate can be considerably reduced.

However, the formation of time segments impairs the frequency resolution because the spectral components brought about by the signal rise and fall at the start and finish of the window are also fed to the spectrum of the original signal. An improvement in the frequency resolution can be attained by having the edge gradient of the window function less steep, also by extending the edge region within the window. These measures require overlapping of adjacent time segments. If the edge region is expanded so far that the window functions no longer have a constant value in any region, then adjacent temporal segments must overlap each other by 50 per cent. This means that the number of scanning values and, accordingly the quantity of data, is doubled.

The publications of J. P. Princen and A. B. Bradley "Analysis Synthesis Filter Bank Design Based On Time Domain Aliasing Cancellation", IEEE Transactions, ASSP-34, No. 5, Oct. 1986, pp 1153 through 1161, and of J. P. Princen, A. W. Johnson and A. B. Bradley "Subband/Transform Coding Using Filter Bank Design Based On Time Domain Aliasing Cancellation", IEEE Int. Conference on Acoustics, Speech and Signal Processing 1987, pp 2161 through 2164, teach that for a 50 per cent overlap of successive temporal segments the quantity of data is reduced to the original value by encoding only every second scanning value. The aliasing components resulting from the subsampling cancel each other out by using the method described in the above citation after inverse transformation upon assembling the time segments.

It has become apparent that with amplitude fluctuations within a time segment, in particular with signals first appearing from a silence during the course of a block, these signals are superimposed with perceivable disturbances after transmission. The cause of the perceivability lies in the fact that the disturbances also appear before the signals start to appear and, therefore, are insufficiently masked. These disturbances can, for example, ensue through quantization noise which superimposes the short-time spectrum. After inverse transformation, the noise components then appear within the total block in the time domain.

In order to reduce these disturbances, the signals in the block in which the level change appears can be subjected to a compression and, after the inverse transformation, an expansion. However, if the raising of the level for executing the compression does not extend over the entire block, then the signal components are linked with aliasing components, which cannot be cancelled by the expansion, in another block region.

SUMMARY OF THE INVENTION

It is the object of the invention, with a method of the aforementioned type, to combine an improvement in the analysis sharpness of the signal to be transformed with an improvement in the signal-to-noise ratio with strong signal changes.

With the inventive method, signals which are subjected to only small changes in level are coded in overlapping blocks with window functions which produce a high analysis sharpness. When an increase in level which exceeds a predetermined threshold value is detected the window functions are modified. The modified window functions have a small of no overlap. The short-time spectra appearing after transformation no longer undergo sub-sampling but, on the contrary, are scanned in full. Accordingly, no aliasing components can occur. Using this method it is accepted that the spectral values which occur twice within the overlap region increase the quantity of data to be coded. The signals weighted with the modified window functions can be subjected to a compression with subsequent complementary expansion. In this manner, the disturbances, also referred to as pre-echo, which appear after the inverse transformation before the increase in level are lowered. Following the increase in level, the signal is again processed in overlapping blocks.

DESCRIPTION OF THE PREFERRED EMBODIMENTS

Figure 1:
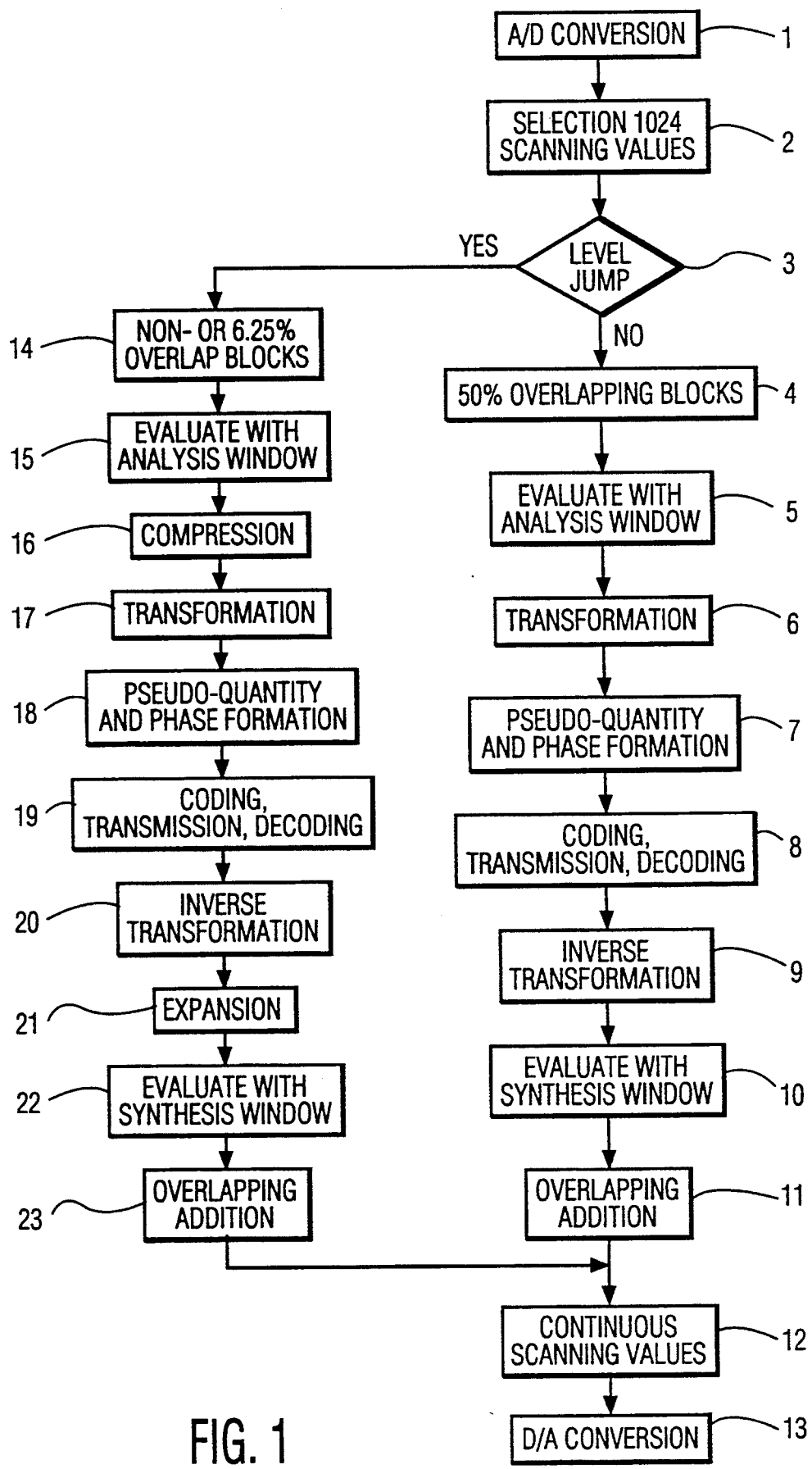
FIG. 1 is a flow diagram with the main procedure steps of the invention.

The individual procedure steps for executing the method of the invention are represented in the flow diagram of FIG. 1. The starting variable of the method forms an analog audio signal which is converted in procedure step 1 into a digital signal, in which amplitude values are present as scanning values in digital coded form.

In procedure step 2 the continuous signal is windowed, in that a series of successive scanning values is selected, in the example presented here 1024 scanning values are selected. In procedure step 3 a decision is made regarding an increase in level which exceeds a predetermined threshold level. If no increase in level is present the next procedural step is procedure step 4. In procedure step 4, blocks with temporal overlaps of 50 per cent are formed from the selected scanning values. The same scanning values sometimes are present, in adjacent blocks, albeit in different places. Therefore, the scanning values present in the first half of a current block correspond to the scanning values present in the second half of the preceding block.

In procedure step 5 the signal segments contained in the blocks are assessed using analysis windows. In this manner a soft signal start and run-out are generated at the boundaries of the block to increase the analysis sharpness for the subsequent transformation.

Procedure step 6 forms the transformation of the present discrete-time signal into a discrete-frequency signal. Instead of amplitude values, spectral values now appear, each of which encompass a real and an imaginary part.

A conversion of the spectral values into a presentation with pseudoquantities and phases takes place in procedure step 7. The spectral values are then prepared and suited for a transmission method such as is described in DE-OS 35 06 912. A sub-scanning is also performed at the same time in connection with the conversion of the spectral values. The result is that the number of values to be transmitted again coincides with the number of original scanning values. The doubling of the data caused by the 50 per cent overlapping of the blocks is thus cancelled.

In the procedure step 8, the steps of coding, if applicable the data reduction, transmission and decoding are combined. These procedure steps can be carried out using the method described in DE-OS 35 06 912.

In procedure step 9 a transformation inverse to trial in procedure step 6 takes place. However, with the preceding data reduction, the signal to be inversely transformed is a modified signal freed from psycho-acoustically redundant components. The result of the inverse transformation is again discrete-time signals in the form of blocks representing signal segments of a continuous signal. However, only half the original scanning values are present in the blocks.

In the procedure step 10, the blocks are weighted with synthesis windows. The synthesis window functions are so designed that they again compensate the signal distortions which have come about as a result of the weighting with the analysis windows in procedure step 5. The synthesis window functions used here fulfill two criteria. Firstly, they complement themselves to unity in the overlap region using the corresponding analysis windows. Secondly, the difference between the analysis window reflected in the center of the overlap region, multiplied by the synthesis window for the block n, and the analysis window reflected in the center of the overlap region multiplied by the synthesis window for the block n+1 in the overlap region, is equal to zero. This latter criterion contains the compensation for the aliasing components In procedure step 11 the blocks overlapping by 50 per cent are added, whereby the aliasing components in the two blocks to be superimposed appear with reversed preceding signs so that upon addition it compensates to zero. In procedure step 12 the formation of continuous scanning values through combining the blocks to each other with the windowed signal segments is illustrated. Finally, in procedure step 13, a conversion of the digital, coded scanning values into an analog signal is carried out, whereby, objectively, components are in fact missing but which, subjectively, is experienced as identical with the original signal.

When an increase in level above a preselected value is detected in procedure step 3, the process continues to procedure step 14. In procedure step 14 blocks with no temporal overlaps with each other or, temporal overlaps of much less than 50 per cent, are formed from the selected scanning values. In procedure step 15 the signal segments contained in the blocks are assessed using analysis windows which have a steep gradient course. Compression takes place in procedure step 16. Procedure step 17, which corresponds to procedure step 6, constitutes the transformation of the existing discrete-time signal into a discrete-frequency signal. Instead of amplitude values, spectral values appear each of which has a real and an imaginary part. In procedure step 18, conversion of the spectral values into a representation with pseudoquantities and pseudophases takes place. The spectral values are then prepared and suited for transmission by some known method, such as that described in DE-OS 35 06 912. However, in contrast to procedure step 7, sub-sampling is not performed.

In procedure step 19, which corresponds to procedure step 8, several individual steps are combined encompassing the coding, if applicable the data reduction, transmission and decoding. These procedure steps can be carried out according to the method described in DE-OS 35 06 912.

In procedure step 20 a transformation inverse to that in procedure step 17 takes place. However, because of the preceding data reduction, the signal to be inversely transformed is a modified signal which is free from psycho-acoustically redundant components. The result of the inverse transformation is again discrete-time signals in the form of blocks representing signal segments of a continuous signal. However, only half the original scanning values are present in the blocks. An expansion takes place in the subsequent procedure step 21. In procedure step 22 the blocks are weighted with synthesis windows. The synthesis window functions are so designed that they again compensate the signal distortions which have come about as a result of the weighting with the analysis windows in procedure step 15. The block, insofar as they overlap each other, are added in procedure step 23. The common procedure steps 12 and 13 described above are completed.

Figure 2:
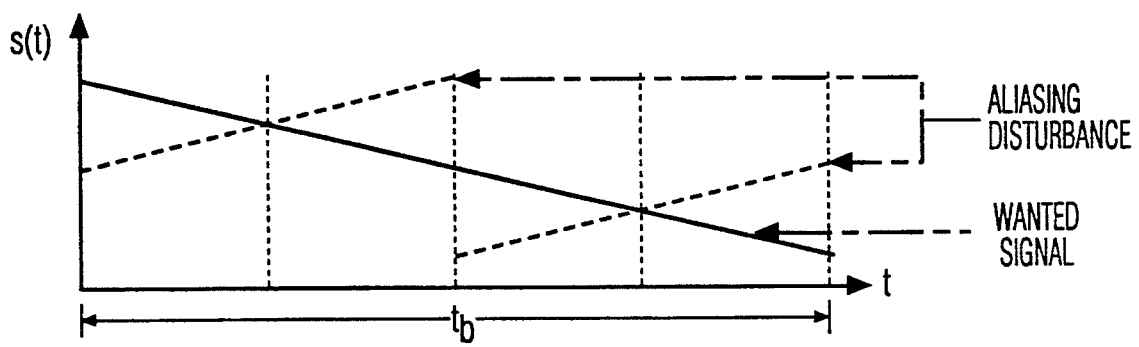
FIG. 2 is a representation of wanted signal and aliasing components upon application of the method according to the citation "Princen & Bradley".

FIG. 2 shows the wanted signal and the aliasing components with a transformation block that results by employing the "time domain aliasing cancellation" method according to Princen and Bradley. The aliasing components result from reflecting the wanted signal of a block half at the line of symmetry tb/4 or 3tb/4. By using the 50 per cent overlapping of adjacent blocks the aliasing component is clearly distinguished because it has sign reversed from that of the wanted signal. Therefore, the correct wanted signal is recovered after normal transformation and inverse transformation.

If a block were to be separately subjected to a compression and subsequently processed according to the "time domain aliasing cancellation" method, the compression process could not be cancelled by expansion. If, for example, signals in the first quarter of a block are increased the increased signal components appear as aliasing components in the second quarter of the block and are combined additively with the wanted signal. This aliasing component modified by the compressor can no longer be compensated using the aliasing components of the neighboring blocks.

Before executing a compression, therefore, switchover to another window is made when an increase in the signal is detected, a window which does not generate blocks with major overlaps, and the "time domain aliasing cancellation" method can no longer be applied to these blocks. The temporal sequence of such blocks is illustrated in FIGS. 3 and 4.

Figure 3:
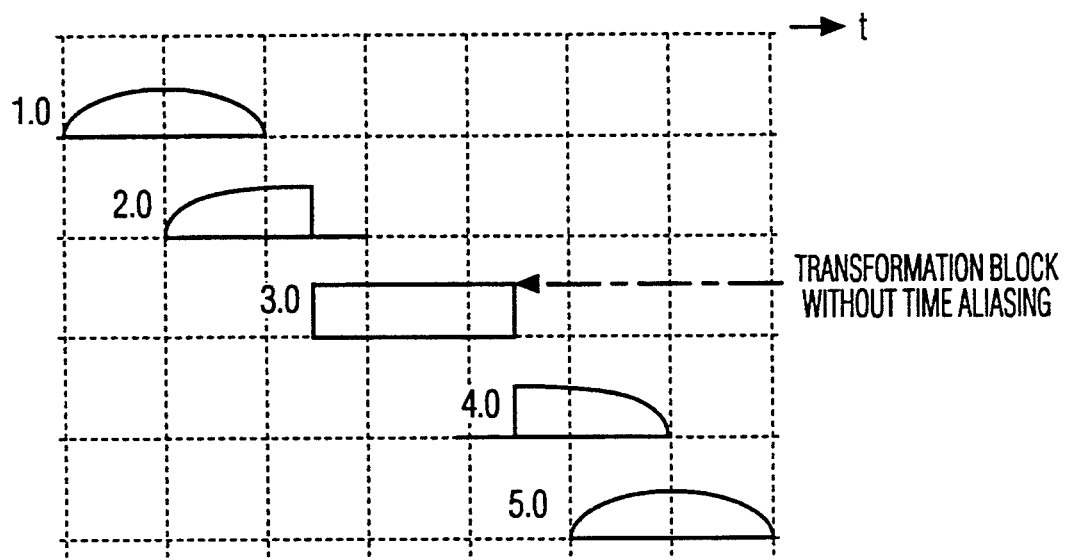
FIG. 3 is a representation of the temporal sequence of window functions at an increase in the signal.
Figure 4:
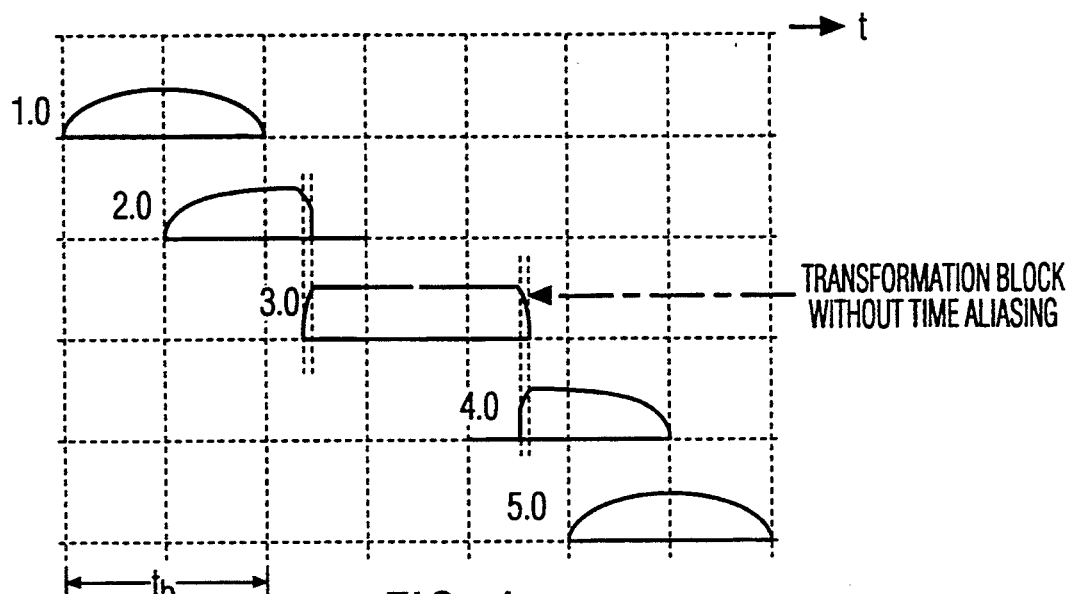
FIG. 4 is a representation similar to FIG. 3 but with different window functions.

FIG. 3 shows the temporal sequence of blocks with presentation of the window functions used for the weighting upon detection of an increase in the signal, whereby no overlapping blocks appear during the increase in the signal. Line 1 shows a block which overlaps the preceding and following blocks by 50%. Aliasing components appear in both halves of the block.

Line 2 shows an initial block for 0% overlap with the following block. Aliasing components only appear in the first half of the block because the final quarter of the block is identical to zero.

Line 3 shows a block of the same length but without overlapping assessed using a rectangular window function. In this block compression and expansion of the signal extending over a part of the block length can be carried out.

Line 4 shows an end block for 0% overlap with the preceding block. Aliasing components appear only in the second half of the block because the first quarter of the block is identical to zero.

Line 5 shows a block corresponding to the block shown in line 1. This block has a 50% overlap with the preceding and following blocks.

FIG. 4 shows the temporal sequence of blocks with presentation of the window functions used for the weighting upon the detection of an increase in the signal. Blocks overlapping by 6.25% appear during the increase in the signal.

Line 1 shows a block which overlaps the preceding and following blocks by 50%. Aliasing components appear in both halves of the block. Line 2 shows an initial block having 6.25% overlap with the following block. Aliasing components appear only in the first half of the block because the final quarter of the block is identical to zero. Line 3 shows a block of the same length but without overlapping assessed using a rectangular window function. In this block compression and expansion of the signal extending over a part of the block length can be carried out. Line 4 shows an end block for 6.25 per cent overlap with the preceding block. Aliasing components only appear in the second half of the block because the first quarter of the block is identical to zero, In line 5 a block corresponding to the block shown in line 1 is again illustrated. This block has a 50 per cent overlap with the preceding and following blocks. The windows used in the region of the increase in the signal have an average constant progression and edges corresponding to a cosine function. Because of the overlapping of the blocks in the region of the edges, after transformation a number of spectral values, increased by 12.5% compared to the overlap-free rectangular blocks shown in FIGURE 3, result. In order to take this into account with the coding, multiple-block-encompassing bit allocation, more coarse quantizing or suppression of less relevant spectral values can be employed.

Figure 5:
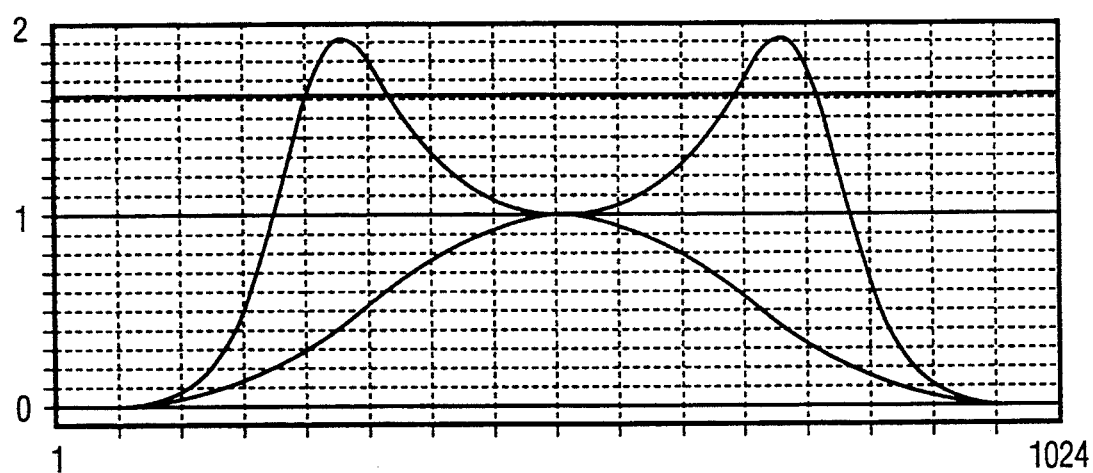
FIG. 5 shows window functions suitable for the application of the "time domain aliasing cancellation" method.

FIG. 5 shows window functions suitable for the "time domain aliasing cancellation" method, namely an analysis and a synthesis window with which the synthesis window function was calculated from the freely chosen analysis window function according to the invention in accordance with the following equations:

$$S_n(t) = \frac{a_n - 1(T_B/2 - t)}{a_n(T_B/2 - t) * a_n + 1(t) - a_n + 1(T_B/2 - t)} ; 0 < t < T_B/2$$

$$S_{n+1}(t) = \frac{a_n(T_B/2 - t)}{a_n(T_B/2 - t) * a_n + 1(t) - a_n + 1(T_B/2 - t) * a_n - 1(T_B/2 - t)} ; 0 < t < T_B/2$$

where:
$a_n(t)$ is the analysis window function for the block n,
$s_n(t)$ is the synthesis window function for the block n,
$a_{n+1}(t)$ is the analysis window function for the block n+1,
$s_{n+1}(t)$ is the synthesis window function for the block n+1, and
$T_B$ is the block time.

When applying these equations, the signals evaluated with the analysis and synthesis windows, which together exhibit a complementary unity response, complement each other and aliasing components are compensated.

Figure 6A:
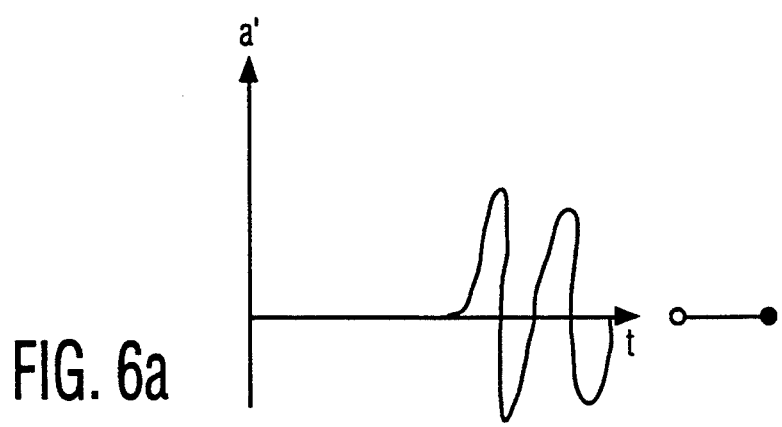
FIG. 6 depicts are representations of a signal starting in the course of a block in original as well as after inverse transformation.
Figure 6B:
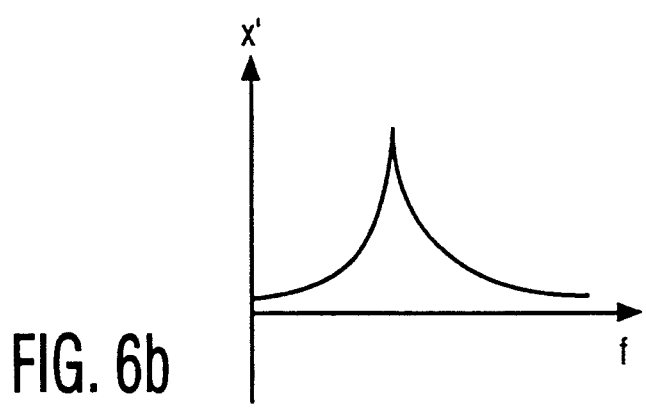
Figure 6C:
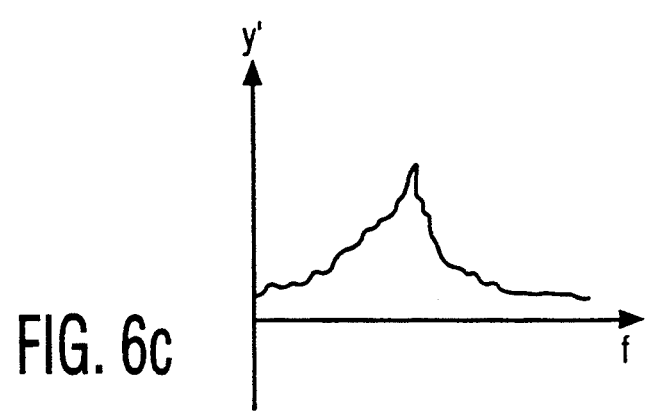
Figure 6D:
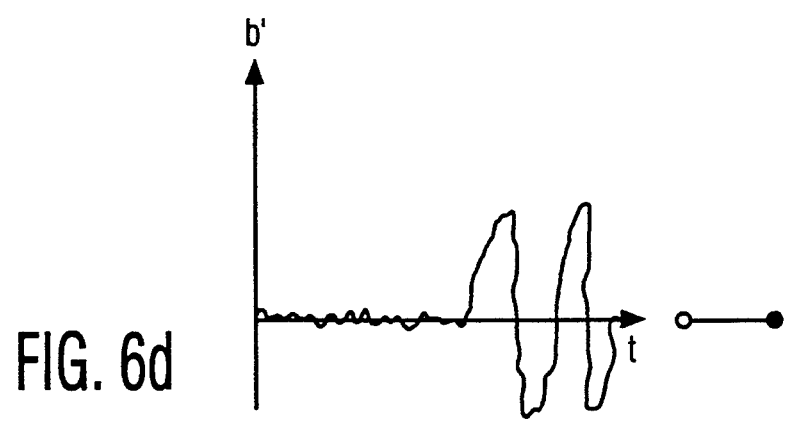

An example of the inventive method where a signal suddenly appears from silence somewhere within a block, for example in its second half, is described with respect to FIGS. 6a through 6d. FIG. 6a shows the example for the time domain. The transformed signal is shown in FIG. 6b. Because of quantization errors with the coding, an interference spectrum is superimposed on the spectrum shown in FIG. 6b and the spectrum shown in FIG. 6c results. After inverse transformation this interference spectrum influences the course of the signal from the start of the signal, and also at the beginning of the block as FIG. 6d shows. The pre-masking effect is less than the post-masking effect, and therefore the interference may become audible. Appropriate compression within the block before the transformation and transmission, and expansion after the transmission and inverse transformation can substantially improve the signal-to-noise ratio.

Figure 7:
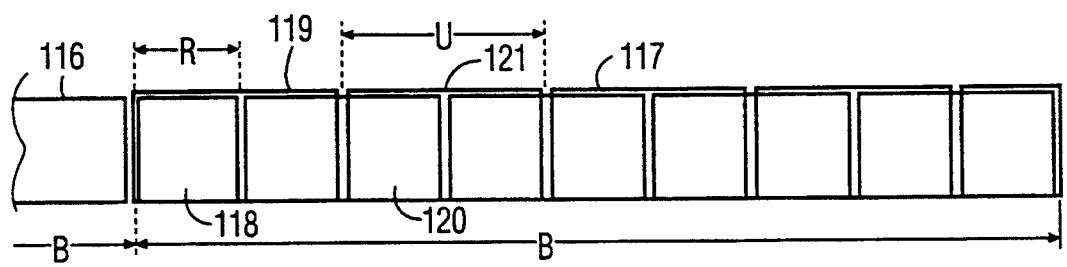
FIG. 7 shows the subdivision into sub-blocks.

For this purpose, as shown in FIG. 7, every block 116, 117, ... is subdivided into sub-blocks. These sub-blocks 119, 120, 121, ... have, apart from on the block edges, equal temporal expansions such that they overlap each other by half. On the block edges there is an overlap with sub-block 118 amounting to half a temporal expansion. The average signal energies are determined in these overlapping rectangular sub-blocks (energy in the time segment divided by the expansion of the time segment).

Figure 8:
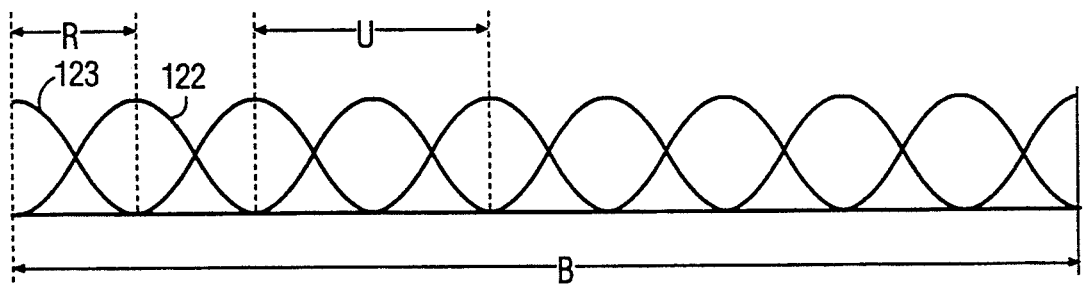
FIG. 8 shows a window function in which the blocks are superimposed.

In a following step, as shown in FIG. 8, the initially rectangular sub-blocks 119, 120, 121, ... are evaluated with $\cos^2$ window functions 122. The time segments on the block edges, which only have half the temporal expansion of the remaining sub-blocks, are weighted with a $\cos^2$ half-window 123. The overlapping weighting functions complement each other at every point in time of the signal block to produce a unity response.

Figure 9:
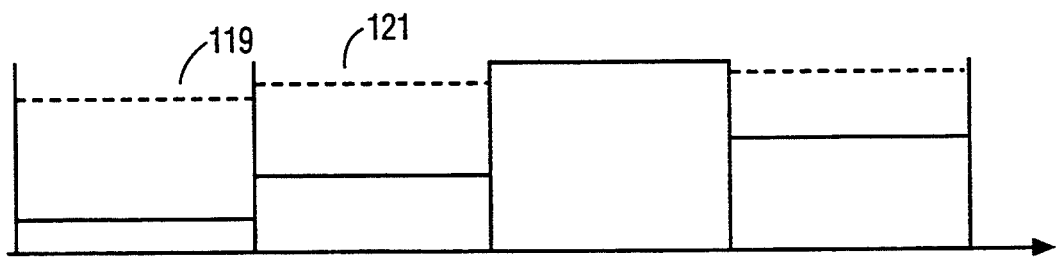
FIG. 9 shows the energy progression within a block with and without compression.

FIG. 9 shows how the signals in the sub-blocks 119, 120, 121, corresponding to the detected average energies, represented by the full lines are amplified or attenuated, so that the average energies in the sub-blocks 119, 120, 121, ... become roughly equal, as represented by the dotted lines. For reasons of clarity, the blocks are not shown with dotted lines. The amplification and attenuation of the signals leaves the relationship between the block's useful energy and the block's interference energy, resulting from the coding, unaltered. On the other hand, through the use of these measures the same signal-to-noise ratio exists in all sub-blocks. The same signal-to-noise ratio is realized that would have been realized if blocks corresponding to the Size of the sub-blocks, had been selected from the very beginning by windowing. The aforementioned disadvantages of shorter blocks are, however, avoided.

It is advisable, for psycho-acoustic reasons, to make the size of a temporal expansion in the overlapping sub-blocks approximately 2 to 4 ms. This corresponds to the formation of some 10 to 20 sub-blocks for blocks with about 1000 scanning values and a scanning frequency of 44.1 kHz. Furthermore, it is advisable, for psycho-acoustic reasons, to limit the signal amplification to a maximum value of, for example, 40 dB.

It is sufficient to quantize the amplification factors, whereby the quantization can be performed relatively coarsely in order to limit the additional data required for the quantizing stages. The quantization can be so executed that smaller quantization step sizes can be chosen for smaller amplification factors than for larger. In doing this, the quantization is so dimensioned that the average energy in the boosted sub-block does not exceed that of the sub-block with the highest detected energy, i.e. the reference block. In this way it is possible, in fact, to even gain an increase in the ratio of the block's wanted energy to the block's interference energy. However, in this case the signal-to-noise ratio of all sub-blocks is no longer identical, rather only nearly the same.

Figure 10:
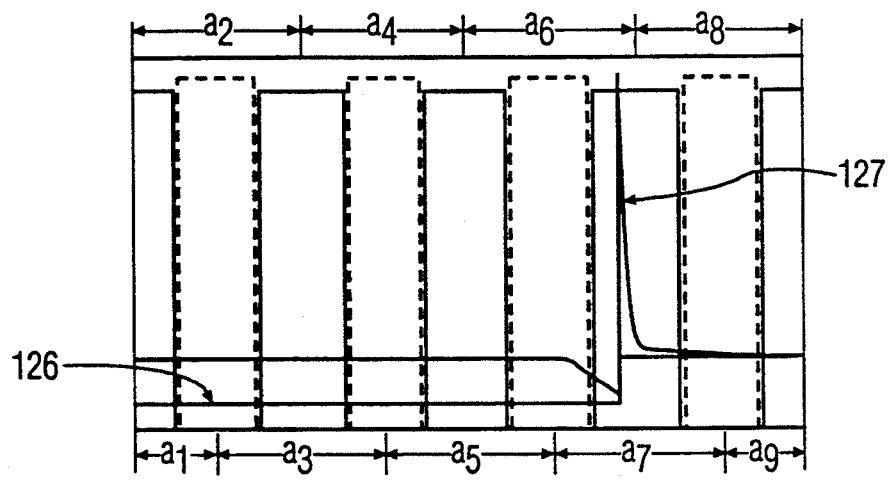
FIG. 10 is a representation of the non-raised and raised signal at an increase in the signal with non-overlapping windows for the energy calculations of the sub-blocks.
Figure 11:
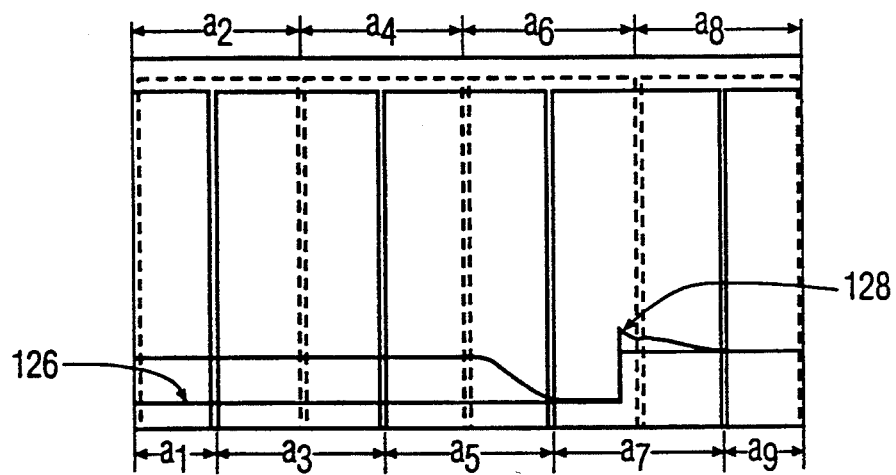
FIG. 11 is a representation similar to FIG. 10 but with 50 per cent overlapping windows for the energy calculations of the sub-blocks.

If only the sub-blocks in which the compression of the signal takes place are weighted through overlapping window functions, but not the sub-blocks which serve for determining the average signal energies for calculating the amplification factors, then magnified amplification factors can result with certain signal increases. This case is illustrated in FIG. 10 for an ideal rectangular increase. The non-boosted signal progression is designated 126, the boosted signal progression 127. The lower-case letters a0 through a8 represent the boosting factors, also referred to as amplification factors. The magnification then appears if the edge of the increase and the edge of the sub-block do not coincide.

In order to keep the magnification small, according to a further development, the determination of the average signal energies is also carried out with blocks overlapping by 50 per cent, albeit with rectangular windows in this case. They correspond directly to the sub-blocks in which the signals are amplified. The result of this measure is illustrated in FIGURE; 11 for the same signal increase. The non-boosted signal progression is again designated 126 and the boosted, modified signal progression is designated 128.

If the method explained up to this point is applied to the entire audio signal, the amplification factors are only correct for the high-energy spectral components because it is essentially these which determine the factors. In audio signals, the spectral components up to approximately 3 kHz are almost always those with the highest energy.

If the method for the high-energy spectral components up to about 3 kHz has the greatest presentation accuracy, then increases in the signals at higher frequencies With lower-energy components lead to greater inaccuracies upon coding, possibly leading to audible interference.

The signal can also be subjected to pre-emphasis prior to transmission and coding, and de-emphasis after transmission and decoding.

We claim:

1. In a method of transmitting an analog signal including the steps of converting said analog signal into a digital signal, subdividing said digital signal into successive blocks using windows and converting said blocks into spectra using transformation, coding said spectra and transmitting said spectra, decoding and reconverting said spectra into signal segments using inverse transformation, and joining together said blocks containing said signal segments, an improvement comprising the steps of:
    a) evaluating said blocks for level changes, and when said level is below a predetermined level;
    b) subdividing said signal into blocks and overlapping said blocks by 50%;
    c) assessing the signal segments within said blocks using analysis windows;
    d) transforming said signal segments using subsampling and time domain aliasing cancellation to compensate for aliasing components;
    e) inverse transforming said signal segments;
    f) assessing said signal segments using synthesis windows;
    g) rejoining said blocks in overlapping fashion; and
    when said level change is above said predetermined level
    h) subdividing said signal into blocks and overlapping by between 0% and n%, where n<50%.
    i) fully scanning said signal segments;
    j) compressing said signal segments;
    k) transforming said signal segments;

l) inverse transforming said signal segments;
m) expanding said signal segments.

2. In a method of transmitting an analog signal including the steps of converting said analog signal into a digital signal, subdividing said digital signal into successive blocks using windows and converting said blocks into spectra using transformation, coding said spectra and transmitting said spectra, decoding and reconverting said spectra into signal segments using inverse transformation, and joining together said blocks containing said signal segments, an improvement comprising the steps of:

a) evaluating said blocks for level changes, and when said level is below a predetermined level;
b) subdividing said signal into blocks and overlapping said blocks by 50%;
c) assessing the signal segments within said blocks using analysis windows;
d) transforming said signal segments using subsampling and time domain aliasing cancellation to compensate for aliasing components;
e) inverse transforming said signal segments;
f) assessing said signal segments using synthesis windows;
g) rejoining said blocks in overlapping fashion; and
when said level change is above said predetermined level
h) subdividing said signal into blocks and overlapping by between 0% and n%, where n<50%;
i) fully scanning said signal segments;
j) compressing said signal segments;
k) transforming said signal segments;
l) inverse transforming said signal segments; and
m) expanding said signal segments; wherein
the window functions of said synthesis windows are determined depending upon the window functions of the corresponding analysis windows in the overlap region according to the equations:

$$Sn(t) = \frac{a_n - 1(T_B/2 - t)}{a_n(T_B/2 - t) * a_n + 1(t) - a_n + 1(T_B/2 - t)} ; 0 < t < T_B/2$$

$$Sn + 1(t) = \frac{a_n(T_B/2 - t)}{a_n(T_B/2 - t) * a_n + 1(t) - a_n + 1(T_B/2 - t) * a_n - 1(T_B/2 - t)} ; 0 < t < T_B/2$$

where
$a_n(t)$ is the analysis window function for the block n,
$s_n(t)$ is the synthesis window function for the block n,
$a_n+1(t)$ is the synthesis window function for the block n+1,
$s_n+1(t)$ is the synthesis window function for the block n+1,
TB is the block time;
subdividing the blocks which overlap less than 50% into sub-blocks and, depending on the average signal energies in said sub-blocks, altering said sub-blocks using amplifying or attenuating factors during compression and expanding said sub-blocks whereby aliasing components are complementary and cancel.

3. The method of claim 2 wherein said subdividing is effected by weighting with said window functions having a constant value over the time segment, said constant value being produced by a combined effect of said analysis and synthesis window functions.

4. The method of claim 3, wherein said window functions overlap and the blocks are weighted on both edges with window functions of half the temporal width.

5. The method claim 4 wherein said blocks are weighted with further, "soft" window functions which exhibit a constant progression, become zero at the boundaries of the sub-blocks and complement each other in the whole block to a constant weighting value of unity.

6. The method of claim 5 wherein said window functions are $\cos^2$ half-windows on the block edges and are windows corresponding to $\cos^2$ windows between said edges.

7. The method of claim 2 wherein said signals within the respective sub-blocks are amplified or attenuated as a function of a constant factor associated with respective sub-blocks.

8. The method of claim 7 wherein said amplification and attenuation factors are a function of signal segments corresponding to the average energies in said sub-blocks as detection segments.

9. The method of claim 8 wherein said detection segments, and said sub-blocks, are obtained through weighting of said blocks with window functions which have a constant value over the time segment, said constant value being produced by a combined effect of said analysis and synthesis window functions.

10. The method of claim 9 wherein said window functions overlap and the blocks are weighted on both edges with window functions of half the temporal width.

11. The method claim 10 wherein said blocks are weighted with further, "soft" window functions which exhibit a constant progression, become zero at the boundaries of the sub-blocks and complement each other in the whole block to a constant weighting value of unity.

12. The method of claim 11 wherein said window functions are $\cos^2$ half-windows on the block edges and are windows corresponding to $\cos^2$ windows between said edges.

* * * * *